United States Patent [19]

Landmeier

[11] Patent Number: 5,381,160
[45] Date of Patent: Jan. 10, 1995

[54] SEE-THROUGH DIGITIZER WITH CLEAR CONDUCTIVE GRID

[75] Inventor: Waldo L. Landmeier, Phoenix, Ariz.

[73] Assignee: CalComp Inc., Anaheim, Calif.

[21] Appl. No.: 784,929

[22] Filed: Oct. 30, 1991

Related U.S. Application Data

[63] Continuation-in-part of Ser. No. 767,102, Sep. 27, 1991, abandoned.

[51] Int. Cl.⁶ ............................................. G09G 3/00
[52] U.S. Cl. ..................................... 345/174; 178/18
[58] Field of Search ................. 340/712, 784 I, 707, 340/706; 178/18, 19; 345/87, 100, 102, 104, 173–183

[56] References Cited

U.S. PATENT DOCUMENTS

| | | |
|---|---|---|
| 4,523,654 | 6/1985 | Quayle et al. .................... 178/18 |
| 4,639,720 | 1/1987 | Rympalski ........................ 340/712 |
| 4,704,501 | 11/1987 | Taguchi et al. .................. 178/19 |
| 4,853,499 | 8/1989 | Watson ............................. 178/19 |
| 4,945,348 | 7/1990 | Ibamoto et al. .................. 340/712 |
| 4,988,837 | 1/1991 | Murakami et al. ............... 179/19 |
| 5,149,919 | 9/1992 | Greanias et al. ................ 340/706 |

*Primary Examiner*—Ulysses Weldon
*Assistant Examiner*—Gin Goon
*Attorney, Agent, or Firm*—William F. Porter, Jr.; Donald A. Streck

[57] ABSTRACT

A combined display and electromagnetic digitizing input device for pen-driven computers. There is a graphics display panel having a viewing surface and a back surface. A first grid of parallel transparent conductors for connection to electromagnetic digitizing electronics to sense the location of an electromagnetic stylus is disposed over one of the surfaces. A second grid of parallel transparent conductors for connection to the electromagnetic digitizing electronics is disposed over the first grid of parallel transparent conductors electrically insulated therefrom and perpendicular thereto. The two grids are constructed of flexible transparent substrates carrying a plurality of transparent indium tin oxide conductors thereon. For improved performance, shielding is provided in the form of a sheet of a transparent conductive material connected to ground potential disposed below the grids of conductors as well as a sheet of a metal foil disposed across the extents of the grids of conductors. Viewing of the display panel or backlighting of the display panel can take place through the grids depending on the display panel employed.

6 Claims, 4 Drawing Sheets

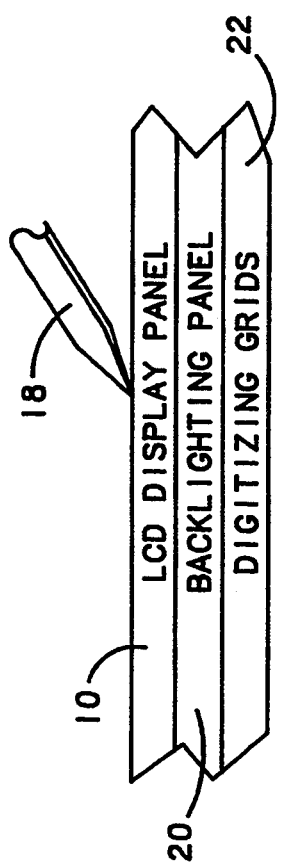
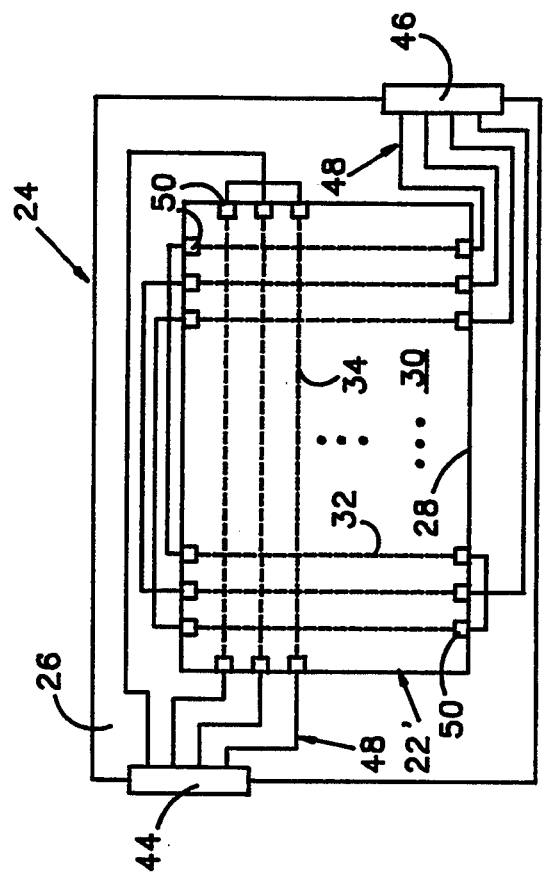
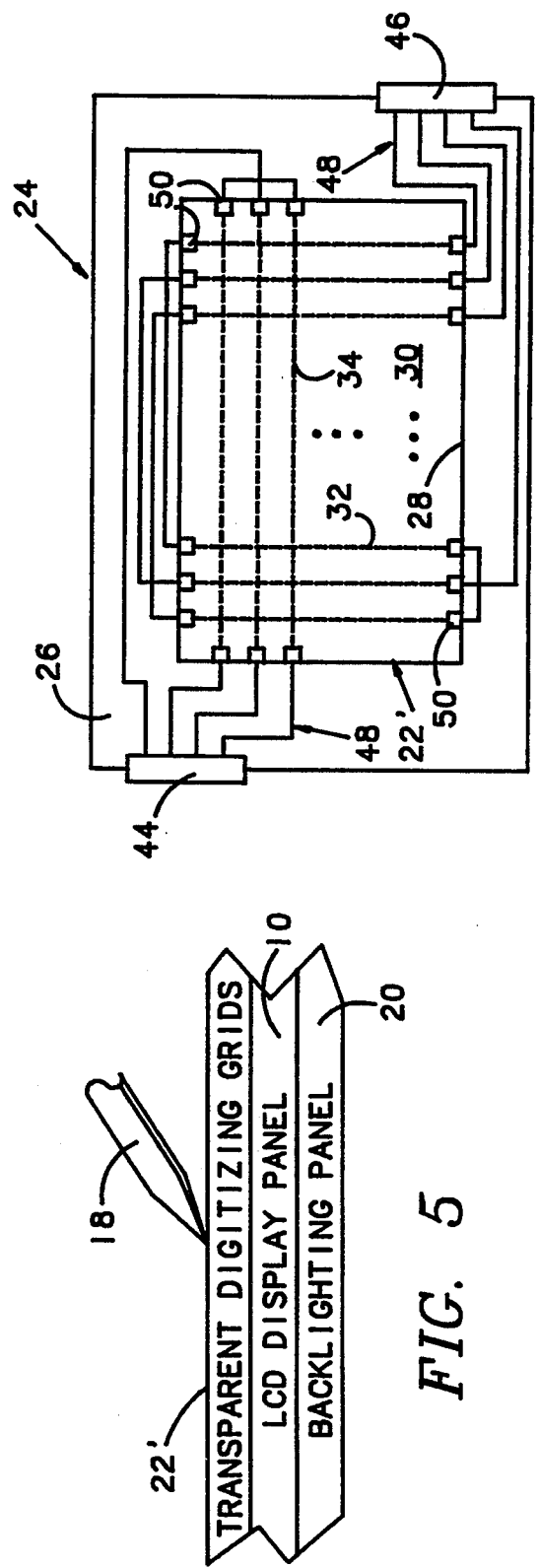

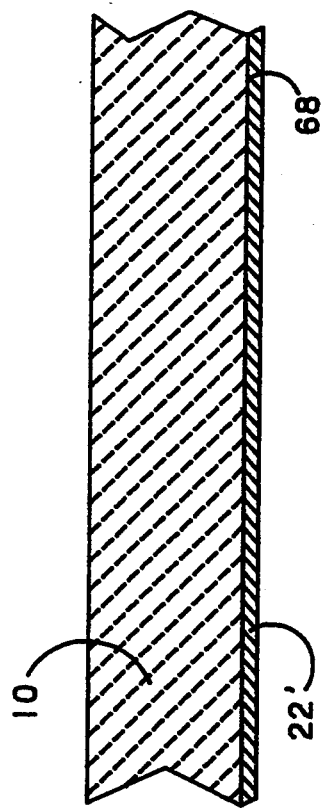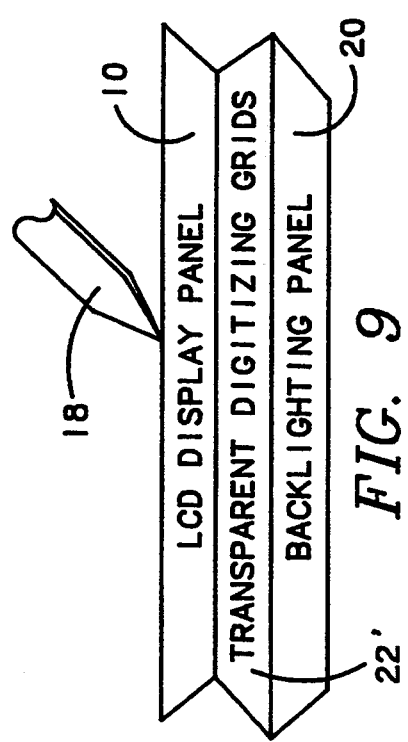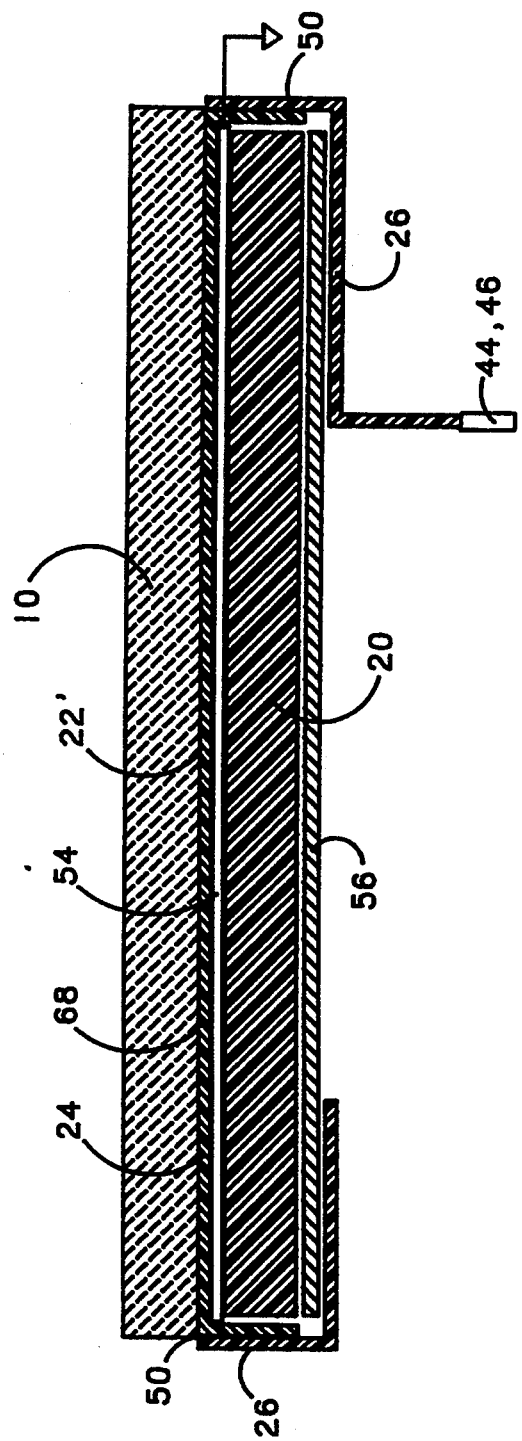

SEE-THROUGH DIGITIZER WITH CLEAR CONDUCTIVE GRID

This application is a continuation-in-part of application Ser. No. 767,102, filed Sep. 27, 1991, now abandoned.

BACKGROUND OF THE INVENTION

This invention relates to digitizing tablets and, more particularly, to a combined display and digitizing input device for a computer comprising, a graphics display panel; a first grid of parallel transparent conductors disposed over a surface of the display panel; and, a second grid of parallel transparent conductors disposed over the first grid of parallel transparent conductors electrically insulated therefrom and perpendicular thereto.

Digitizing tablets have been available as inputting devices for use with computers for a number of years. Traditionally, they have been used for digitizing drawings and for inputting to CAD/CAM, desktop publishing systems, and the like. In the typical prior art digitizing tablet system, the tablet itself contains an X-grid of wires and a Y-grid of wires perpendicular thereto. A stylus device is moved over the surface of the tablet and the position of the stylus device is sensed in the X and Y coordinate system defined by the X and Y grids of wires by interaction between the stylus device and the grids of wires. Most typically, the interaction is electromagnetic or electrostatic.

More recently, digitizing tablets have gained greatly in importance in their association with computers as the primary input device in so-called pen-driven computing systems. In such systems, the digitizing tablet is associated with a display panel as depicted in FIG. 1 and the combination is employed in the manner of early "light pens" and cathode ray tube (CRT) displays wherein displayed choices on the CRT could be selected by placing a light-sensing pen against the face of the CRT. In those prior art CRT/light pen systems, the selection made by the user could be determined by the point in the raster scanning pattern where the electron beam creating the display was sensed by the light pen. By replacing the CRT with a liquid crystal display (LCD) panel 10 and the light pen with a digitizing tablet 12, a lightweight and portable input device is created. Thus, as shown in FIG. 1, a menu 14 can be displayed on the LCD panel 10 and individual items 16 in the menu 14 can be selected by employing the stylus 18. As can be appreciated, the potential for such devices and pen-driven computing in combination for various applications is virtually boundless.

The pen-driven LCD/digitizer input devices presently commercially available in the prior art are of several types. One operates electrostatically and the others operate electromagnetically. The electrostatic device is made by Scriptel and its manner of operation is depicted in FIGS. 2 and 3. The digitizing portion 60 comprises a sheet of glass 62 having a layer of indium tin oxide (ITO) 64 disposed over the bottom surface thereof. The digitizing portion 60 is then positioned over the LCD panel 10. The stylus 18 is moved over the surface of the glass 62. The glass 62 is, of course, a dielectric layer and it electrically separates the stylus 18 from the ITO layer 64. The ITO layer 64 is transparent and resistively conductive. The ITO layer 64 is connected at its edges to electrostatic drivers 66, 66' for each of the directions of the coordinate system associated with the digitizing portion 60. The location of the stylus 18 in the X or Y direction can be determined as follows. First, an electrostatic signal is applied by the driver 66. The signal sensed by the stylus 18 is a function of the resistance $R_1$. Next, an electrostatic signal is applied by the driver 66'. The signal sensed by the stylus 18 in this case is a function of the resistance $R_2$. The position of the stylus 18 can then be determined using interpolative techniques as a function of the differences in the electrostatic signals sensed by the stylus 18 caused by the differences in the resistances $R_1$ and $R_2$. The Scriptel device is not cordless (i.e. there is a connecting cable between the stylus 18 and the digitizing portion 60) as is desired in pen-driven LCD/digitizer input devices. Also, it is subject to the problems of electrostatically operating digitizers such as moisture and hand effects.

The electromagnetic devices as built by companies such as CalComp (the assignee of this application), Wacom, Kurta, and Numonics employ a grid structure placed below the LCD/backlight assembly as shown in simplified functional cross section in FIG. 4. All of the foregoing with the exception of the Numonics device are cordless. The top surface over which the stylus 18 is moved is the LCD panel 10. Below the LCD panel 10 is a backlighting panel 20 which illuminates the LCD panel 10 for easy viewing. Finally, the digitizing grids 22 are placed below the backlighting panel 20. Positional sensing of the stylus 18 is accomplished by the use of electromagnetic fields which exist between the stylus 18 and the digitizing grids 22 in any manner well known to those skilled in the art. Because of this structure, there are limitations on the placement of components, the digitizing technology, and its performance. An LCD panel of the type having a printed circuit board across its back surface carrying associated driving components cannot be employed as the metal of the printed circuit board will interfere with the electromagnetic fields and render the digitizing apparatus inoperative. The Scriptel (electrostatic) device, of course, does not have this problem since any printed circuit board associated with the LCD panel is not positioned between the transmitting and receiving components. Because of the distances and the electrostatic fields associated with the LCD panel 10 and the backlighting panel 20, the prior art electromagnetic approaches may also suffer from jitter and other problems.

Another major consideration is thickness. Every manufacturer of pen-driven LCD/digitizer input devices would like to be able to supply a zero (0) thickness tablet and, therefore, a zero (0) thickness digitizer. All present electromagnetic digitizers, however, require at least 0.1 inch of thickness for their grid assembly.

Wherefore, it is an object of the present invention to provide an LCD panel in combination with a digitizing tablet for use in pen-driven computing applications where the tablet employs electromagnetic sensing, sensitivity is maximized, and problems caused by adjacent electrostatic fields are virtually eliminated.

It is another object of the present invention to provide an LCD panel in combination with a digitizing tablet for use in pen-driven computing applications where any type of LCD panel can be employed.

It is still another object of the present invention to provide a transparent digitizing grid system which can be disposed over the surface of an LCD panel without interfering with the viewing of a display on the panel.

It is yet another object of the present invention to provide a transparent digitizing grid system which can be disposed over the surface of an LCD panel wherein the grid assembly is of a thickness of approximately 0.020 inch so as to approach a zero (0) thickness.

It is a further object of the present invention to provide an LCD panel in combination with a digitizing tablet for use in pen-driven computing applications where the tablet employs electromagnetic sensing, the LCD panel can be mounted on a printed circuit board, and the printed circuit board is not disposed between transmitting and receiving portions of the digitizing tablet.

Other objects and benefits of the invention will become apparent from the detailed description which follows hereinafter when taken in conjunction with the drawing figures which accompany it.

SUMMARY

The foregoing objects have been achieved by the combined display and electromagnetic digitizing input device for a computer of the present invention comprising, a graphics display panel; a first grid of parallel transparent conductors including means for connection to electromagnetic digitizing electronics to sense the location of an electromagnetic stylus in a first axis of a coordinate system associated therewith disposed over a surface of the graphics display panel, the first grid of parallel transparent conductors comprising a first flexible transparent substrate carrying a plurality of first transparent indium tin oxide conductors thereon; and, a second grid of parallel transparent conductors including means for connection to the electromagnetic digitizing electronics to sense the location of the electromagnetic stylus in a second axis of the coordinate system associated therewith disposed over the first grid of parallel transparent conductors electrically insulated therefrom and perpendicular thereto, the second grid of parallel transparent conductors comprising a second flexible transparent substrate carrying a plurality of second transparent indium tin oxide conductors thereon.

In one embodiment, the first and second grids of parallel transparent conductors comprising the electromagnetic digitizing input device are disposed over a viewing surface of the graphics display panel and the graphics display panel is viewed through the electromagnetic digitizing input device.

In another embodiment, the first and second grids of parallel transparent conductors comprising the electromagnetic digitizing input device are disposed over a back surface of the graphics display panel and the graphics display panel is backlit through the electromagnetic digitizing input device.

In the preferred embodiment, improved performance is provided by shielding in the form of a sheet of a transparent conductive material connected to ground potential disposed between the first and second grids of parallel transparent conductors and the viewing surface in the one embodiment or under the first and second grids of parallel transparent conductors in the other embodiment; and, a sheet of a metal foil disposed under and across the extents of the first grid of parallel transparent conductors and the second grid of parallel transparent conductors.

DESCRIPTION OF THE DRAWINGS

FIG. 4 is a functionally labeled simplified cross section through a prior art digitizing tablet and display panel according to a second embodiment.

FIG. 5 is a functionally labeled simplified cross section through a digitizing tablet and display panel according to the basic structure of the present invention in a non-preferred embodiment.

FIG. 6 is a simplified plan view of a basic digitizing tablet grid structure according to the present invention.

FIG. 9 is a functionally labeled simplified cross section through a digitizing tablet and display panel according to the basic structure of the present invention in the preferred embodiment.

FIG. 10 is an enlarged cross section of a transparent digitizing grid associated with a display panel for use in pen-driven computing applications according to the present invention in the preferred embodiment thereof.

FIG. 11 is a detailed cross section of a digitizing tablet associated with a display panel for use in pen-driven computing applications according to the present invention in the preferred embodiment thereof.

DESCRIPTION OF THE PREFERRED EMBODIMENT

Figure 1:
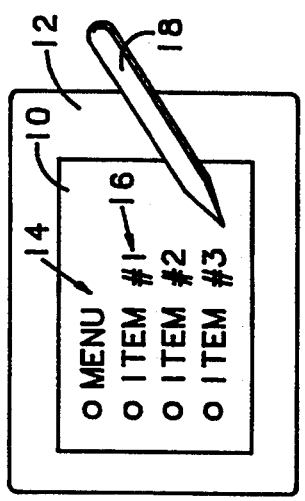
FIG. 1 is a simplified drawing of a prior art digitizing tablet associated with a display panel for use in pen-driven computing applications.
Figure 2:
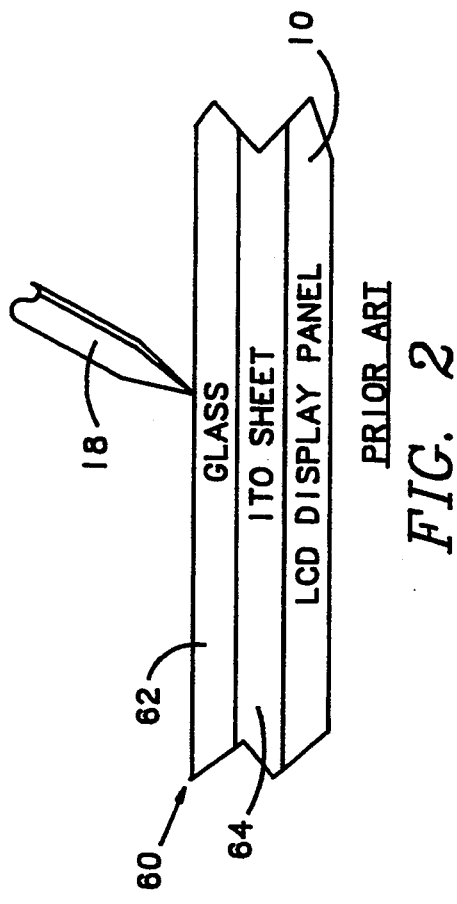
FIG. 2 is a functionally labeled simplified cross section through a prior art digitizing tablet and display panel according to a first embodiment.
Figure 3:
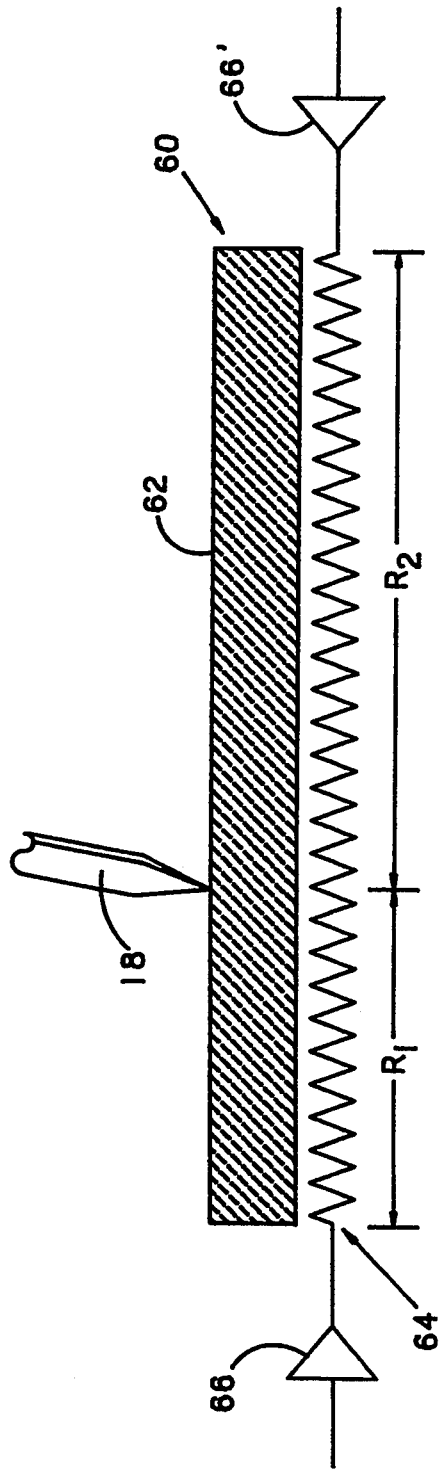
FIG. 3 is a functional diagram of the operation of the digitizing tablet of FIG. 2.

The basic construction of pen-driven LCD/digitizer input device according to the present invention in a first embodiment is shown in simplified functional cross section in FIG. 5. The top surface over which the stylus 18 is moved are the digitizing grids 22'—which in this case are transparent. As will be appreciated by those skilled in the art from the description which follows hereinafter, it is the novel use and positioning of a transparent grid structure directly on one of the surfaces of the display employed which allows the objectives of the present invention to be attained. Below the transparent digitizing grids 22' is the LCD panel 10 and below that is the backlighting panel 20. How this structure can be obtained and a construction of an LCD/digitizer input device according to this embodiment of the present invention will now be described in detail. This particular embodiment of the present invention is non-preferred in all cases only because the user must view the display through the grid structure of the digitizer. While the grid structure is of film thicknesses, the edges of the transparent conductive runs may still be seen to some slight degree at some times and under some conditions. Thus, the preferred embodiment which eliminates this requirement is the preferred embodiment when it can be used. As will be appreciated, however, the preferred embodiment cannot be employed with all display panels. The greater flexibility of the following, first-described embodiment makes it ideal (and therefore preferred) for such applications.

The assignee of this application manufactures cordless digitizing tablet systems employing conductive and dielectric inks on flexible substrate materials which are supported by a rigid substrate. As will be appreciated from the description which follows hereafter, the preferred LCD/digitizer input device of this invention employs a similar construction and utilizes much of the technology therefrom with the LCD panel replacing the rigid substrate. The flexible substrate assembly 24 including the transparent digitizing grids 22' is best understood by reference to FIGS. 6-8. The flexible substrate assembly 24 comprises an outer portion 26 having a rectangular window opening 28 therein. An inner portion 30 is disposed over the window opening 28. Both the outer portion 26 and the inner portion 30 can be of mylar or a similar material. The inner portion 30 is sized to fit over the LCD panel 10 to be employed therewith and, accordingly, is transparent. The outer portion 26 can be transparent or colored, as desired, since it will not be seen.

The inner portion 30 has the transparent digitizing grids 22' formed thereon as transparent X-conductors 32 and transparent Y-conductors 34. The conductors 32, 34 depicted in FIG. 6 are representative only and in the interest of simplicity are not intended to be to scale or in the proper number. Note also that for the same reason the thickness of layers as depicted in the drawings are not necessarily in relational scale. As those skilled in the art will recognize from the description which follows, preferably the X-conductors 32 are connected according to a loop-back pattern and the Y-conductors 34 are connected according to a straight pattern, which technique was developed by the assignee of this application for use in cordless electromagnetic digitizers. In tested embodiments, the transparent conductors 32, 34 were formed of an indium tin oxide (ITO) film material commercially sold under the tradenames Southwall M-20 and Southwall Heatmirror 88. In the tested embodiments the ITO material was applied to the mylar substrate material in sheet form and then 2 mil non-conductive strips were etched from the sheet every 0.36 inch to form the conductive runs comprising the transparent conductors 32, 34 (as compared with runs 0.020 to 0.050 inches wide in the prior art). As those skilled in the art will readily recognize and appreciate, the ITO film material is resistively conducting. It was generally accepted in the art that conductors of a digitizing grid to be employed in an electromagnetic sensing approach could not be formed of the ITO film because the resistance would be too high and power requirements would, therefore, be too large. Had the conductors been constructed according to the present invention for electromagnetic sensing as implemented by techniques other than those of the assignee herein as wherein the grid is driven and the signal sensed in the stylus, the expected problems would have existed. For example, a standard grid run in a driven grid system according to the prior art construction techniques would be approximately 0.1 ohm while a run according to the techniques employed in the present invention would be in the order of 500 ohms. The inventor herein, however, recognized that with the approach of the assignee where the stylus is driven and the signal is sensed in the grid, the problems expected by others skilled in the art could, in fact, be avoided. Thus, by employing the attributes of that environment the inventor herein was ultimately successful.

Figure 8:
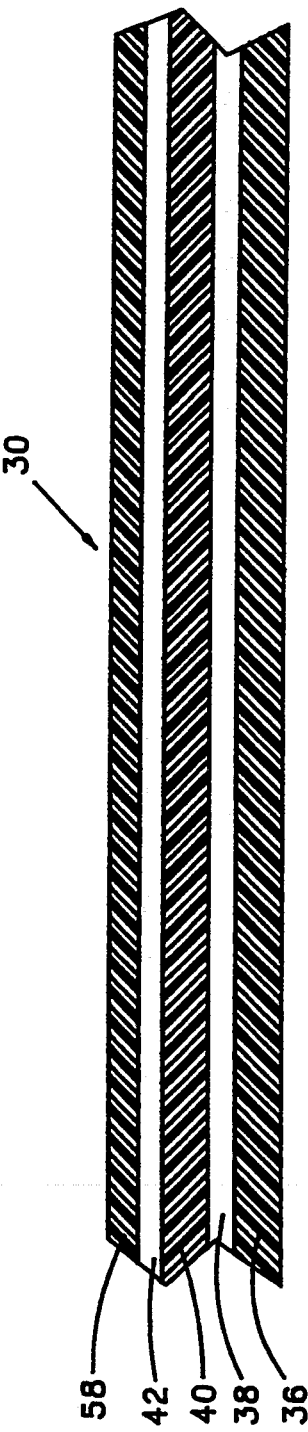
FIG. 8 is a more detailed cross section of the transparent grid portion of the apparatus of FIG. 5.

As best seen in the enlarged cross sectional drawing of FIG. 8, the transparent inner portion 30 carrying the digitizing grids 22' is formed in two layers. A first piece of transparent substrate 36 having ITO transparent conductive material 38 thereon forming the X-conductors 32, for example, comprises the first layer with a second piece of transparent substrate 40 having ITO transparent conductive material 42 thereon forming the Y-conductors 34 adhesively attached thereover comprising the second layer.

As further depicted in FIG. 6, the outer portion 26 carries a Y-axis connector 44 and an X-axis connector 46 for electrically connecting the flexible substrate 24 to the associated electromagnetic digitizing electronics (not shown) which are generally conventional in nature and form no part of the present invention. The Y-axis connector 44 and X-axis connector 46 are electrically connected to the Y-conductors 34 and the X-conductors 32, respectively, by conductive ink runs 48 formed on the substrate material of the outer portion 26 in the usual manner. Preferably, the point at which electrical connection is made between the Y-conductors 34 and the X-conductors 32 on the one hand and the conductive ink runs 48 on the other hand is accomplished employing a commercially available, electrically conductive, two-sided adhesive tape 50.

Figure 7:
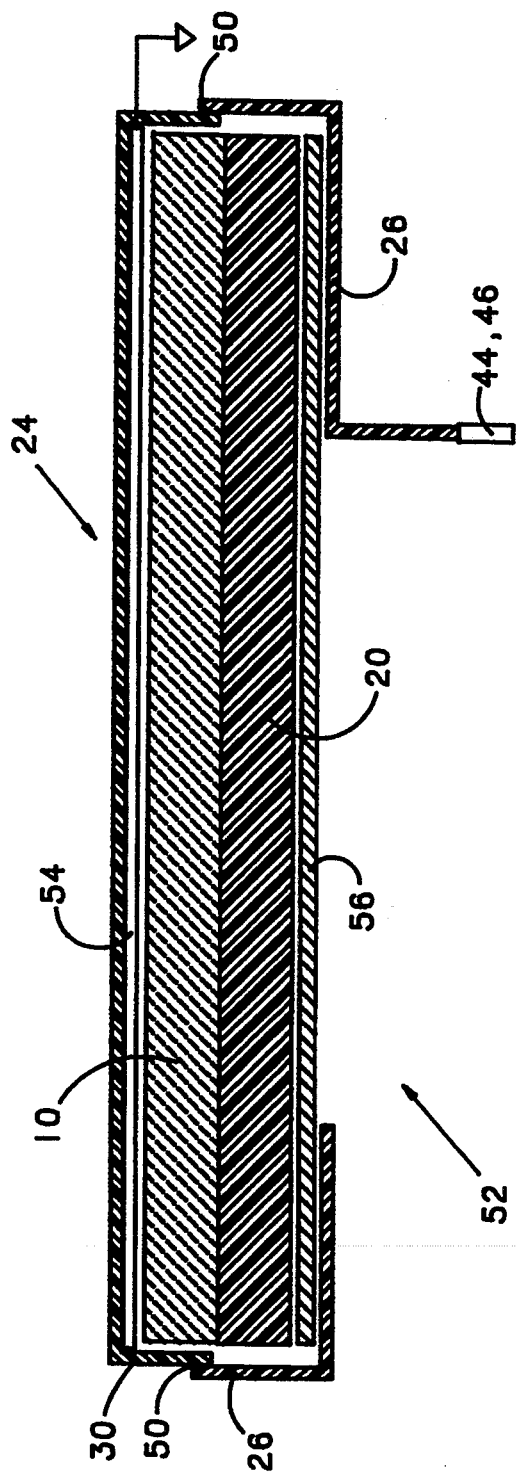
FIG. 7 is a detailed cross section of a digitizing tablet associated with a display panel for use in pen-driven computing applications according to the present invention in a non-preferred embodiment thereof.

A preferred LCD/digitizing tablet assembly 52 for this embodiment is as shown in FIG. 7. As mentioned earlier herein, the flexible substrate 24 is wrapped about the LCD panel 10, which acts as a supporting substrate for the flexible substrate 24. Preferably, a transparent conductive layer of ITO material 54 is disposed between the top of the LCD panel 10 and the flexible substrate 24 and connected to ground potential to act as an electrostatic shield to prevent electrostatic charges from interfering with the electromagnetic digitizing process by conducting them to ground. The electrostatic shield material 54 can be applied to the top of the LCD panel 10 or to the bottom of the flexible substrate 24, as desired for the particular implementation. Also preferably, a second shield 56 comprising a sheet of aluminum foil non-electrically connected is disposed under the backlighting panel 20 for the further shielding of electromagnetic and electrostatic interference and to aid in the elimination of edge effect problems in the digitizing grids 22'.

As shown in FIG. 8, it is preferred that a thin piece of a tough, transparent protective plastic 58 such as polycarbonate be adhesively attached to the top of the inner portion 30 to prevent damage to the digitizing grids 22' by the stylus 18 in long-term use. The foregoing assembly 52 can then be disposed in an appropriate case (not shown) which, because of the thin size of the materials involved in the flexible substrate 24 (approximately 0.020 inches total thickness), can be quite thin. The thin size of the transparent inner portion 30 also allows the LCD panel 10 and the graphic display information displayed thereon by a computer attached thereto to be viewed in most cases without significant interference or distortion.

The preferred embodiment of the present invention for use with those display panels of a construction which allow its use is shown in FIGS. 9-11. As mentioned earlier herein, while the above-described embodiment wherein the transparent digitizer grids are disposed over the viewing surface of the display can be used without significant interference or distortion, the edges of the transparent conductive runs do exist and, therefore, can be seen under certain conditions. This embodiment eliminates that possibility altogether. As shown in FIG. 9, the transparent digitizing grids 22' are disposed under the LCD display panel 10 between the LCD display panel 10 and the backlighting panel 20. Thus, the light from the backlighting panel 20 passes through the transparent digitizing grids 22' and from there through the LCD display panel 10. Since the only thing passing through the transparent digitizing grids 22' is an overall illumination from the backlighting panel 20, and edge effects of the conductive runs on the transparent digitizing grids 22' are ineffective in causing any noticeable effect to a viewer viewing a display on the LCD display panel 10.

When making an LCD display panel 10 for use in this embodiment, the transparent digitizing grids 22' can be applied and formed right on the back surface 68 of the LCD display panel 10 as depicted in simplified form in FIG. 10. Also, since it is only illumination that is passing through the transparent digitizing grids 22', the transparency of the adhesive used to attach the indium tin oxide sheets to the back surface 68 and each other is not so critical. Where in the prior embodiment the adhesive had to be completely transparent because the LCD display panel 10 was viewed through it, in this case a translucent adhesive is entirely acceptable. Thus, in the manufacturing process, a sheet of indium tin oxide for one of the layers of the transparent digitizing grids 22' could be attached to the back surface 68 and then be etched in place to form the conductive runs.

A preferred construction for this embodiment corresponding to the preferred construction for the prior embodiment of FIG. 7 is shown in FIG. 11. In this case, the flexible substrate 24, if used, is wrapped about the backlighting panel 20, which acts as a supporting substrate for the flexible substrate 24. If the flexible substrate 24 is adhesively attached to the indium tin oxide of the transparent digitizing grids 22' and they are adhesively attached to the back surface 68 as described above, the LCD panel 10 will also contribute to the support. Preferably, a transparent conductive layer of ITO material 54 is disposed between the transparent digitizing grids 22' and the top of the backlighting panel 20 and connected to ground potential to act as an electrostatic shield to prevent electrostatic charges from interfering with the electromagnetic digitizing process by conducting them to ground as described in the prior embodiment. The electrostatic shield material 54 can be applied to the top of the backlighting panel 20 or to the bottom of the flexible substrate 24, as desired for the particular implementation. Also preferably, a second shield 56 comprising a sheet of aluminum foil non-electrically connected is disposed under the backlighting panel 20 for the further shielding of electromagnetic and electrostatic interference and to aid in the elimination of edge effect problems in the digitizing grids 22'. As in the prior embodiment, a sheet of a tough, transparent protective plastic such as polycarbonate be adhesively attached to the top of the LCD panel 10 to prevent damage thereto by the stylus 18 in long-term use.

Wherefore, having thus described the present invention,

What is claimed is:

1. A combined display and cordless electromagnetic digitizing input device for a computer comprising:

a) a graphics display panel having a viewing surface and a non-viewing back surface;
   b) a cordless electromagnetic digitizing input device comprising,
      b1) a first grid of parallel transparent conductors including means for connection to electromagnetic digitizing electronics to sense the location of an electromagnetic stylus in a first axis of a coordinate system associated therewith disposed over said back surface, said first grid of parallel transparent conductors comprising a first flexible transparent substrate carrying a plurality of first transparent indium tin oxide conductors thereon, and
      b2) a second grid of parallel transparent conductors including means for connection to said electromagnetic digitizing electronics to sense the location of said electromagnetic stylus in a second axis of said coordinate system associated therewith disposed over said first grid of parallel transparent conductors electrically insulated therefrom and perpendicular thereto, said second grid of parallel transparent conductors comprising a second flexible transparent substrate carrying a plurality of second transparent indium tin oxide conductors thereon;
   c) a backlighting panel disposed adjacent said electromagnetic digitizing input device for backlighting said graphics display panel through said electromagnetic digitizing input device; and,
   d) a sheet of a transparent conductive material connected to ground potential disposed between said electromagnetic digitizing input device and said backlighting panel for shielding the electrostatic interference.

2. The combined display and cordless electromagnetic digitizing input device for a computer of claim 1 and additionally comprising:

a sheet of a metal foil disposed under said display panel and said electromagnetic digitizing input device across the extents of said first grid of parallel transparent conductors and said second grid of parallel transparent conductors and said backlighting panel.

3. In a combined display and cordless electromagnetic digitizing input device for a computer having a graphics display panel with a viewing surface and a back surface opposite the viewing surface, and a backlighting panel disposed adjacent said digitizing input device for backlighting said graphics display panel through said digitizing input device, a transparent grid wire assembly for electromagnetic positional determination of a stylus in a coordinate system associated with the display panel comprising:

a) a first grid of parallel transparent conductors including means for connection to electromagnetic digitizing electronics to sense the location of the stylus in a first axis of the coordinate system disposed over the back surface, said first grid of parallel transparent conductors comprising a first flexible transparent substrate carrying a plurality of first transparent indium tin oxide conductors thereon;
   b) a second grid of parallel transparent conductors including means for connection to said electromagnetic digitizing electronics to sense the location of the stylus in a second axis of the coordinate system disposed over said first grid of parallel transparent conductors electrically insulated therefrom and perpendicular thereto, said second grid of parallel transparent conductors comprising a second flexible transparent substrate carrying a plurality of second transparent indium tin oxide conductors thereon; and, c) a sheet of a transparent conductive material connected to ground potential disposed over said second grid of parallel transparent conductors and adjacent to the backlighting panel for shielding the electrostatic interference.

4. The transparent grid wire assembly of claim 3 additionally comprising:

a sheet of a metal foil disposed behind the backlighting panel across the extents of said first grid of parallel transparent conductors and said second grid of parallel transparent conductors.

5. In a combined display and cordless electromagnetic digitizing input device for a computer having a graphics display panel with a viewing surface and a back surface opposite the viewing surface, a transparent grid wire assembly to be positioned over the back surface for subsequent electromagnetic positional determination of a stylus in a coordinate system associated with the display panel comprising:

a) a first flexible transparent substrate disposed over the back surface, carrying a plurality of first transparent indium tin oxide conductors thereon comprising a first grid of parallel transparent conductors, and including means for connection to electromagnetic digitizing electronics to sense the location of the stylus in a first axis of the coordinate system;

b) a second flexible transparent substrate adhesively attached to said first flexible transparent substrate, carrying a plurality of second transparent indium tin oxide conductors thereon comprising a second grid of parallel transparent conductors perpendicular to said first grid of parallel transparent conductors, and including means for connection to said electromagnetic digitizing electronics to sense the location of the stylus in a second axis of the coordinate system; and, c) a sheet of a transparent conductive material connected to ground potential disposed over said second grid of parallel transparent conductors for shielding the electrostatic interference whereby backlighting of the graphics display panel by a backlighting panel takes place through said sheet of a transparent conductive material, said first flexible transparent substrate, and said second flexible transparent substrate.

6. The transparent grid wire assembly of claim 5 and additionally comprising:

a sheet of a metal foil disposed behind said backlighting panel across the extents of said first grid of parallel transparent conductors and said second grid of parallel transparent conductors.

* * * * *